(12) United States Patent
Chen et al.

(10) Patent No.: US 8,724,636 B2
(45) Date of Patent: May 13, 2014

(54) METHODS OF RELIABLY SENDING CONTROL SIGNAL

(75) Inventors: Wanshi Chen, San Diego, CA (US); Tao Luo, San Diego, CA (US); Juan Montojo, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 109 days.

(21) Appl. No.: 12/414,357

(22) Filed: Mar. 30, 2009

(65) Prior Publication Data

US 2009/0257449 A1 Oct. 15, 2009

Related U.S. Application Data

(60) Provisional application No. 61/040,823, filed on Mar. 31, 2008, provisional application No. 61/053,347, filed on May 15, 2008, provisional application No. 61/074,861, filed on Jun. 23, 2008.

(51) Int. Cl.
*H04W 72/04* (2009.01)
(52) U.S. Cl.
CPC .................................. *H04W 72/042* (2013.01)
USPC ......... 370/395.1; 370/470; 370/474; 370/505
(58) Field of Classification Search
USPC .............. 370/252, 310.2, 328, 329–339, 349, 370/395.1, 470, 471, 474, 476, 505, 506; 455/422.1; 714/746, 776, 779
See application file for complete search history.

(56) References Cited

U.S. PATENT DOCUMENTS

| | | | |
|---|---|---|---|
| 2002/0141371 A1* | 10/2002 | Hsu | 370/338 |
| 2004/0037224 A1 | 2/2004 | Choi et al. | |
| 2004/0162095 A1 | 8/2004 | Edwards et al. | |
| 2005/0041589 A1 | 2/2005 | Kwon et al. | |
| 2005/0078640 A1 | 4/2005 | Kim et al. | |
| 2005/0138531 A1 | 6/2005 | Kim | |
| 2005/0277419 A1 | 12/2005 | Takano et al. | |
| 2007/0025345 A1 | 2/2007 | Bachl et al. | |
| 2007/0206539 A1 | 9/2007 | Yegani et al. | |
| 2010/0279634 A1* | 11/2010 | Sagfors et al. | 455/127.1 |

FOREIGN PATENT DOCUMENTS

| | | |
|---|---|---|
| CN | 1921415 A | 2/2007 |
| EP | 1317092 A2 | 6/2003 |
| EP | 1509055 A2 | 2/2005 |
| GB | 2424805 A | 10/2006 |

(Continued)

OTHER PUBLICATIONS

Ericsson: "PDCCH blind decoding—Outcome of offline discussions" No. R1-081101, Feb. 11, 2008, XP002542364 Retrieved from the Internet: URL:http://ftp.3gpp.org/tsg_ran/WG1_RL1/TSGR1_52/Docs/?C=N;O=D> [retrieved on Aug. 21, 2009].

(Continued)

*Primary Examiner* — Hoon J Chung
(74) *Attorney, Agent, or Firm* — Anthony R. Morris

(57) ABSTRACT

Downlink PDCCH is communicated in a manner that mitigates a UE from decoding the PDCCH on multiple aggregation levels. Ambiguous payload sizes are identified and modified through zero padding with one or more bits based on the payload size. Aggregation level scrambling sequences can be generated such that a receiving UE can accurately identify the aggregation level on which to decode the PDCCH. Indicator bits that signal the aggregation level to a UE can also be included in the PDCCH.

15 Claims, 16 Drawing Sheets

(56) References Cited

FOREIGN PATENT DOCUMENTS

| KR | 20010029982 A | 4/2001 |
|---|---|---|
| RU | 2251219 C2 | 4/2005 |
| RU | 2286651 C2 | 10/2006 |
| RU | 2305900 C2 | 9/2007 |
| RU | 2305902 C2 | 9/2007 |
| WO | 03030407 A1 | 4/2003 |
| WO | 2004079948 A1 | 9/2004 |
| WO | 2004079949 A1 | 9/2004 |
| WO | 2008024788 A2 | 2/2008 |

OTHER PUBLICATIONS

Ericsson: "Summary of email discussion on DL control signaling" 3GPP Draft; R1-081522, 3rd Generation Partnership Project (3GPP), Mobile Competence Centre ; 650, Route Des Lucioles ; F-06921 Sophia-Antipolis Cedex ; France, vol. RAN WG1, No. Shenzhen, China; Mar. 31, 2008, Mar. 29, 2008, XP050109937.

International Search Report and Written Opinion—PCT/US2009/039010, International Searching Authority—European Patent Office, Sep. 4, 2009.

Nokia Siemens Networks; Nokia: "Implicit Mapping of ACK/NACK Resources" 3GPP Draft; R1-080939, 3rd Generation Partnership Project (3GPP), Mobile Competence Centre ; 650, Route Deslucioles; F-06921 Sophia-Antipolis Cedex; France, vol. RAN WG1, No. Sorrento, Italy; Feb. 11, 2008, Feb. 5, 2008, XP050109411.

NTT DOCOMO: "PDCCH Allocation Based on Hashing Function Generation Method for PDCCH Blind Decoding" 3GPP Draft; R1-081406 PDCCH Blind Decoding, 3rd Generation Partnership Project (3GPP), Mobile Competence Centre ; 650, Route Des Lucioles ;,F-06921 Sophia-Antipolis Cedex ; France, vol. RAN WG1, No. Shenzhen, China; Mar. 31, 2008, Mar. 28, 2008, XP050109823.

Panasonic: "PDCCH payload formats, sizes and CCE aggregation" 3GPP Draft; R1-080975, 3rd Generation Partnership Project (3GPP), Mobile Competence Centre ; 650, Route Des Lucioles ; F-06921 Sophia-Antipolis Cedex ; France, vol. RAN WG1, No. Sorrento, Italy; Feb, 11, 2008, Feb. 5, 2008, XP050109446.

Partial International Search Report—PCT/US2009/039010, International Searching Authority—European Patent Office, Jul. 21, 2009.

Philips: "Analysis of search space design for PDCCH blind decoding" 3GPP Draft; R1-081504, 3rd Generation Partnership Project (3GPP), Mobile Competence Centre ; 650, Route Deslucioles ; F-06921 Sophia-Antipolis Cedex ; France, vol. RAN WG1, No. Shenzhen, China; Mar. 31, 2008, Mar. 26, 2008, XP050109920.

Qualcomm Europe: "Additional details on confusing multiple PDCCH aggregation levels" 3GPP Draft; R1-083169 PDCCH Ambigous Payload Sizes, 3rd Generation Partnership Project (3GPP), Mobile Competence Centre ; 650, Route Des Lucioles ; F-06921 Sophia-Antipolis Cedex ; France, No. Jeju: Aug. 18, 2008,XP050316603.

Qualcomm Europe: "Confusing multiple PDCCH aggregation levels" 3GPP Draft; R1-082544, 3rd Generation Partnership Project (3GPP), Mobile Competence Centre ; 650, Route Deslucioles; F-06921 Sophia-Antipolis Cedex; France, vol. RAN WG1, No. Warsaw, Poland; Jun. 30, 2008, Jun. 24, 2008, XP050110806.

QUALCOMM: "Transport Block Size Set definition, R2-021588" 3GPP TSG-RAN WG2 Meeting 30 [Online] vol. R2-021588, No. 30, Jun. 24, 2002, pp. 1-9, XP002513531 Retrieved from the Internet: URL:http://www.3gpp.org/ftp/tsg_ran/WG2_RL2/TSGR2_30/Docs/Zips/> [retrieved on Jun. 28, 2002].

European Search Report—EP13160670—Search Authority—Munich—Jul. 17, 2013.

European Search Report—EP13160676—Search Authority—Munich—Jul. 23, 2013.

Interdigital Communications et al: "PHICH Index Mapping for Uplink Transmisson for E-UTRA", 3GPP Draft; R1-080776, 3rd Generation Partnership Project (3GPP), Mobile Competence Centre; 650, Routedes Lucioles ; F-06921 Sophia-Antipolis Cedex; France, vol. RAN WG1, No. Sorrento, Italy; Feb. 6, 2008, XP050109260, [retrieved on Feb. 6, 2008], paragraph [0004]—paragraph [0005]—figures 1-2.

Mitsubishi Electric: "Blind detection complexity reduction with UE specific PDCCH scrambling" 3GPP Draft; RI-080405, 3rd Generation Partnership Project (3GPP), Mobile Competence Centre ; 650, Route Des Lucioles ; F-06921 Sophia-Antipolis Cedex ; France, vol. RAN WG1, No. Sevilla, Spain; Jan. 9, 2008, XP050108924 [retrieved on Jan. 9, 2008] the whole document.

Mitsubishi Electric: "UE specific PDCCH scrambling for blind detection complexity reduction" 3GPP Draft; RI-080850, 3rd Generation Partnership Project (3GPP), Mobile Competence Centre ; 650, Route Des Lucioles ; F-06921 Sophia-Antipolis Cedex ; France, vol. RAN WG1, No. Sorrento, Italy; Feb. 6, 2008, Feb. 5, 2008, XP050109330 [retrieved on Feb. 6, 2008]p. 1.

Motorola: "CCE Scrambling for Reliable PDCCH Location Detection", 3GPP Draft; R1-080568 (R1-080094)—CCE Scrambling for PDCCH Location Detection, 3rd Generation Partnership Project (3GPP), Mobile Competence Centre ; 650, Route Des Lucioles ; F-06921 Sophia-Antipolis Cedex ; France, vol. RAN WG1, No. Sevilla, Spain; Jan. 19, 2008, XP050109071.

Motorola: "UL ACK/NACK Implicit Mapping", 3GPP Draft; R1-073380, 3rd Generation Partnership Project (3GPP), Mobile Competence Centre ; 650, Routedes Lucioles ; F-06921 Sophia-Antipolis Cedex ; France, vol. RAN WG1, No. Athens, Greece; Aug. 15, 2007, XP050107004, [retrieved on Aug. 15, 2007], paragraph [0002]-paragraph [0003]—figures 1,2.

Nokia Siemens Networks et al: "Implicit Mapping of ACK/NACK Resources", 3GPP Draft; R1-080315, 3rd Generation Partnership Project (3GPP), Mobile Competence Centre ; 650, Routedes Lucioles ; F-06921 Sophia-Antipolis Cedex ; France, vol. RAN WGI, No. Sevilla, Spain; Jan. 8, 2008, XP050108836, [retrieved on Jan. 8, 2008], paragraph [0001]-paragraph [0004]—figures 1-3; table 1.

Texas Instruments et al: "Choice of CRC Length for PDCCH", 3GPP Draft; R1-074136, TI CRC Length Analysis, 3rd Generation Partnership Project (3GPP), Mobile Competence Centre; 650, Route Des Lucioles; F-06921 Sophia-Antipolis Cedex; France, vol. RAN WG1, No. Shanghai, China; Oct. 2, 2007, XP050107668.

European Search Report—EP11162397—Search Authority—Munich—Jun. 1, 2011.

SAMSUNG: "Configuration of PDCCH candidate sets for the control of blind decoding attempts", 3GPP TSG RAN WG1 Meeting #52 R1-080675, Feb. 15, 2008.

Taiwan Search Report—TW098110810—TIPO—Apr. 15, 2012.

* cited by examiner

METHODS OF RELIABLY SENDING CONTROL SIGNAL

The present Application for patent claims priority to Provisional Application No. 61/040,823 entitled "METHODS OF RELIABLY SENDING CONTROL SIGNAL" filed Mar. 31, 2008, Provisional Application No. 61/053,347 entitled "METHODS OF RELIABLY SENDING CONTROL SIGNAL" filed May 15, 2008, and Provisional Application No. 61/074,861 entitled "METHODS OF RELIABLY SENDING CONTROL SIGNAL" filed Jun. 23, 2008. All of the aforementioned provisional applications are assigned to the assignee hereof and hereby expressly incorporated by reference herein.

BACKGROUND

I. Field

The following description relates generally to wireless communications systems and more particularly to control signals.

II. Background

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system supports a time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

Within a wireless communication system physical channels are normally further divided into dedicated channels and common channels depending on the entities being serviced. A dedicated channel is assigned to facilitating communications between a base station and a specific UE. A common channel is shared by different UEs and is used by a base station to transmit signals that are commonly communicated to all users within the geographic area (cell) being serviced by the base station. According to LTE technology, all allocations are signaled in Shared Control Channels, which are coded separately. Hence, a downlink (or uplink) channel is divided into two separate parts, one for each of control and data messages. The data part (PDSCH—Physical Downlink Shared Channel) carries downlink (or uplink) data for simultaneously scheduled users, while the control part (PDCCH) carries (among others) allocation information for scheduled users. Hence, reliable exchange of control signals is necessary for implementing efficient wireless communication systems.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

A method of transmission that facilitates accurate decoding of PDCCH by a UE is disclosed in accordance with an aspect. The method involves determining an aggregation level for downlink PDCCH for the UE. The payload size for the PDCCH is analyzed to determine if it is ambiguous. In a further aspect, the payload size n is ambiguous if it satisfies the condition n=m/k*24, where k, m are integers, m represents the number of CCEs (Control Channel Elements) and k represents the number of repetitions of a coded block. In a further aspect, if the maximum coding rate is x and 0<x≤1, then corresponding maximum size of an ambiguous payload is 72*(8−m)*x. Ambiguous payload sizes are modified by zero-padding data packets for the downlink PDCCH with one or more bits and transmitting payload with the zero padded data packets. The number of bits for zero padding can be based on the payload size.

Another aspect relates to a processor configured to facilitate accurate decoding of PDCCH by a UE. The processor can comprises a first module for determining if payload size for the PDCCH is ambiguous. In a further aspect, the payload size n is ambiguous if n=m/k*24, and n is less than 72*(8−m)*x wherein x is the maximum coding rate and 0<x≤1 The variables k, m are integers, m represents the number of CCEs and m is less than eight. The integer k represents the number of repetitions of a coded block. For ambiguous payload sizes, a second module also comprised within the processor, changes size of the payload by zero-padding data packets for the downlink PDCCH with one or more bits for ambiguous payload size.

A computer program product, comprising a computer-readable medium is disclosed in accordance with another aspect. The computer-readable medium comprises a first set of codes for causing a computer to determine if payload size of data packets for downlink PDCCH is ambiguous. The medium can also comprise a second set of codes for causing the computer to include one or more bits in the data packets that correspond to the ambiguous payload size for zero padding. A third set of codes, also included in the medium, determine a number of bits used for zero padding based at least on the payload size. In accordance with a further aspect, the payload size (n) is ambiguous if n=m/k*24, where k, m are integers. The variable m is less than 8, m represents the number of CCEs. The variable k represents the number of repetitions of a coded block.

An apparatus for facilitating accurate decoding of PDCCH by a UE is disclosed in another aspect. The apparatus comprises means for determining a payload size for the PDCCH and means for zero-padding data packets for the downlink PDCCH by including one or more bits for ambiguous payload sizes. Upon processing, the payload with zero padding is transmitted utilizing transmission means also included in the apparatus.

A wireless communication apparatus comprising a memory and a processor is disclosed in another aspect. The memory stores instructions for analyzing if data packets for transmission in downlink PDCCH have problematic sizes. If the packets have problematic sizes, the memory stores further instructions for changing the size of such data packets by zero padding them with one or more bits based on the payload size. A processor, coupled to the memory, is configured to execute the instructions stored in the memory.

A method of identifying a valid ACK/NACK (acknowledgement/negative acknowledgement) from amongst a plurality of ACK/NACKs received from a UE on different aggregation levels is disclosed in this aspect. It is initially determined if more than one ACK/NACK are received from the UE in accordance with this aspect. If a plurality of ACK/NACKs have been received, an aggregation level corresponding to downlink PDCCH for which the UE has transmitted the plurality of ACK/NACKs is also identified. All ACK/NACKs received from the UE for all valid aggregation levels less than or equal to the aggregation level of the downlink PDCCH are decoded. Subsequently, attributes associated with each of the decoded ACK/NACKs are analyzed and a valid ACK/NACK from the plurality of ACK/NACKs is selected based at least on the analyzed attributes. In a further aspect, the attributes can comprise SNR statistics and an ACK/NACK with best SNR is identified as a valid ACK/NACK from the plurality of decoded ACK/NACKs. In another aspect, the attributes comprise energy of transmission such that an ACK/NACK with highest energy is identified as a valid ACK/NACK from the plurality of decoded ACK/NACKs.

A wireless communication apparatus, comprising a memory and a processor is disclosed in accordance with another aspect. The memory stores instructions for determining attributes of a plurality of ACK/NACKs received from a UE in response to a transmitted downlink PDCCH. A valid ACK/NACK from the plurality of ACK/NACKs is selected based at least on attributes associated with the plurality of received ACK/NACKs. The processor is coupled to the memory and is configured to execute the instructions stored in the memory.

A computer program product comprising a computer-readable medium is also disclosed in accordance with another aspect. The product comprises a first set of codes for determining if more than one ACK/NACK is received from the UE. A second set of codes for identifying an aggregation level corresponding to downlink PDCCH for which the UE has transmitted the plurality of ACK/NACKs are also comprised within the medium. All ACK/NACKs received from the UE for all valid aggregation levels less than or equal to the aggregation level of the downlink PDCCH are decoded in accordance with a third set of codes in the medium. A fourth set of codes analyze attributes associated with each of the decoded ACK/NACKs and a fifth set of codes select a valid ACK/NACK from the plurality of ACK/NACKs based at least on the analyzed attributes.

Another aspect relates to a method that facilitates accurate decoding of PDCCH. The method involves determining an aggregation level to be used for a downlink PDCCH transmission to a specific UE and determining an offset based at least on the aggregation level. Resources for uplink ACK/NACK for the UE are mapped utilizing an offset determined based on the aggregation level. Resource assignment messages with the aggregation level dependent offset are generated and transmitted to the UE in the downlink PDCCH.

A wireless communication apparatus comprising a memory and a processor is disclosed in accordance with another aspect. The memory stores instructions for generating resource assignment messages to be transmitted in a downlink PDCCH with an aggregation level dependent offset. A processor, coupled to the memory, is configured to execute the instructions stored in the memory.

Another aspect relates to a computer program product, comprising a computer-readable medium. The medium comprises a first set of codes for determining an aggregation level to be used for a downlink PDCCH transmission to a specific UE. A second set of codes for mapping resources for uplink ACK/NACK for the UE utilizing an offset determined based on the aggregation level is also comprised in the medium. Resource assignment messages with the aggregation level dependent offset are generated and transmitted respectively to the UE on the downlink PDCCH in accordance with the third and fourth set of codes also included in the medium.

An apparatus that facilitates accurate decoding of PDCCH is disclosed in accordance with yet another aspect. It comprises means for determining, means for mapping resources and means for generating the resource assignment messages. The means for determining is used to identify an aggregation level to be used for a downlink PDCCH transmission to a specific UE. Accordingly, resources for uplink ACK/NACK for the UE utilizing an offset determined based on the aggregation level are mapped by the mapping means while the messages to be transmitted in the downlink PDCCH are generated by a generating means also comprised within the apparatus.

A method that facilitates in accurate decoding of PDCCH is disclosed in yet another aspect. The method involves determining an aggregation level associated with a downlink PDCCH and generating a sequence corresponding to the aggregation level for the PDCCH. The CRC (Cyclic Redundancy Check) bits for the downlink PDCCH are scrambled utilizing the generated sequence and transmitted in the downlink PDCCH.

Another aspect relates to a wireless communication apparatus. The apparatus comprises a memory that stores instructions for scrambling CRC (Cyclic Redundancy Check) bits for downlink PDCCH utilizing a sequence generated corresponding to an aggregation level for the downlink PDCCH and a processor, coupled to the memory, configured to execute the instructions stored in the memory.

A computer program product, comprising a computer-readable medium is disclosed in accordance with this aspect. The medium comprises codes for determining an aggregation level associated with a downlink PDCCH and generating a scrambling sequence corresponding to the aggregation level for the PDCCH. It further includes code for scrambling the CRC (Cyclic Redundancy Check) bits for the downlink PDCCH utilizing the generated scrambling sequence and transmitting the scrambled bits in the downlink PDCCH.

Another aspect is related to an apparatus that facilitates accurate decoding of PDCCH. The apparatus comprises means for scrambling CRC (Cyclic Redundancy Check) bits for a downlink PDCCH utilizing an aggregation level dependent sequence and means for transmitting the scrambled CRC bits.

A method of receiving PDCCH is disclosed in accordance with yet another aspect. The method comprises receiving and decoding a downlink PDCCH comprising CRC bits scrambled with an aggregation level dependent sequence. It further comprises steps of descrambling the decoded bits using the scrambling sequence to identify the aggregation level associated with the sequence and checking the CRC for the identified aggregation level.

Another aspect relates to a wireless communication apparatus. The apparatus comprises a memory that stores instructions for descrambling decoded CRC (Cyclic Redundancy Check) bits received on downlink PDCCH. The CRC bits are descrambled utilizing a sequence generated corresponding to an aggregation level for the downlink PDCCH. A processor, coupled to the memory, is configured to execute the instructions stored in the memory.

A computer program product comprising a computer-readable medium is also disclosed in yet another aspect. The medium comprises code for determining an aggregation level associated with a downlink PDCCH and generating a sequence corresponding to the aggregation level for the PDCCH. The CRC (Cyclic Redundancy Check) bits for the downlink PDCCH are scrambled utilizing the generated sequence and transmitted in the downlink PDCCH.

Another aspect relates to an apparatus that facilitates accurate decoding of PDCCH. The apparatus comprises means for receiving CRC bits scrambled with an aggregation level dependent scrambling sequence and means for decoding a received downlink PDCCH on an associated aggregation level. The aggregation level is obtained by descrambling the CRC (Cyclic Redundancy Check) bits received in the downlink PDCCH utilizing the aggregation level dependent sequence.

A method of transmission that facilitates accurate decoding of PDCCH by a plurality of UEs, is disclosed in accordance with yet another aspect. An aggregation level associated with a downlink PDCCH for each of the plurality of UEs is initially identified in accordance with this method. A scrambling sequence corresponding to an aggregation level for each of the UEs is generated and CRC bits for each of the UEs are scrambled using respective scrambling sequence. The scrambled CRC bits are then transmitted in a downlink PDCCH on an identified aggregation level to each of the UEs.

Another aspect relates to a wireless communication apparatus comprising a memory that stores instructions for generating a respective scrambling sequence corresponding to an aggregation level of a downlink PDCCH for each of a plurality of UEs. A processor, coupled to the memory, is configured to execute the instructions stored in the memory.

A computer program product, comprising a computer-readable medium is disclosed in accordance with this aspect. The medium comprises codes for identifying an aggregation level associated with a downlink PDCCH for each of the plurality of UTEs. A second set of codes for generating an scrambling sequence corresponding to an aggregation level for each of the UEs are also comprised within the medium. The CRC bits for each of the UEs using are scrambled respective scrambling sequence in accordance with a third set of codes included in the medium and the scrambled CRC bits are transmitted in a downlink PDCCH on an identified aggregation level to each of the UEs according to a fourth set of codes included in the medium.

An apparatus that facilitates accurate decoding of PDCCH is disclosed in accordance with yet another aspect. The apparatus comprises means for generating a scrambling sequence based on respective aggregation levels associated with downlink PDCCH to be received by each of a plurality of UEs. It also includes means for encoding CRC bits to be transmitted to the plurality of UEs utilizing the aggregation level dependent scrambling sequence and means for transmitting the PDCCH with the encoded CRC bits to one or more of the plurality of UEs.

A method of transmission that facilitates UE to accurately decode PDCCH is disclosed in accordance with yet another aspect. The method comprises identifying an aggregation level to be associated with downlink PDCCH of a specific UE and including at least a bit to indicate the aggregation level within the downlink PDCCH. In a further aspect, the bit is included if a payload size associated with the downlink PDCCH is an ambiguous payload size that causes a receiving UE to decode the downlink PDCCH on more than one aggregation level.

A wireless communication apparatus, comprising a memory and a processor is disclosed in accordance with yet another aspect. The memory stores instructions for transmitting one or more bits that indicate an aggregation level associated with a downlink PDCCH to a receiving UE. The processor is coupled to the memory and is configured to execute the instructions stored in the memory.

A computer program product, comprising a computer-readable medium is disclosed in accordance with yet another aspect. The medium comprises a first set of codes for identifying an aggregation level associated with a downlink PDCCH for a UE. A second set of codes, are also comprised in the medium, for including one or more bits within the PDCCH, such that they indicate the aggregation level to the UE. Another aspect relates to an apparatus that facilitates accurate decoding of PDCCH. The apparatus comprises means for identifying an aggregation level associated with a downlink PDCCH for a specific UE. The PDCCH comprising one or more bits that indicate the aggregation level is sent to the UE by a transmitting means also included within the apparatus.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
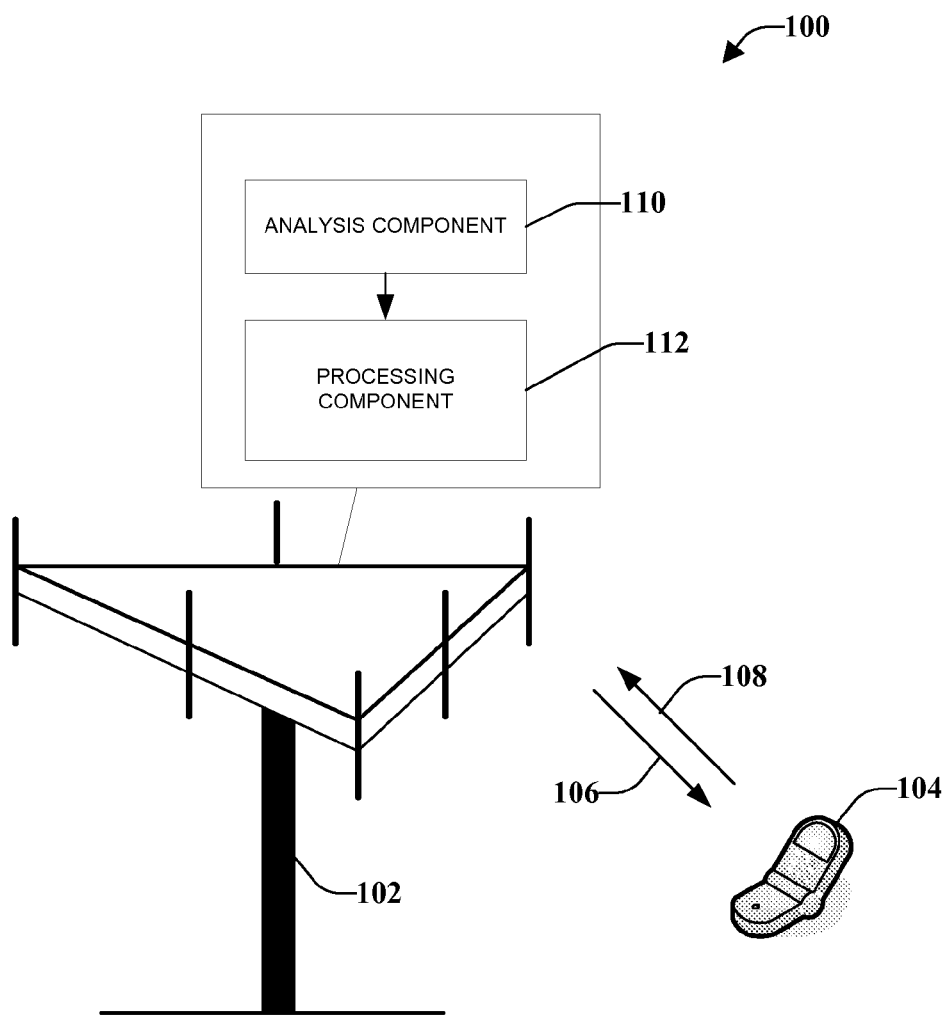
FIG. 1 is a schematic diagram of a multiple access wireless communication system according to one or more aspects.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM☐, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring now to FIG. 1, a multiple access wireless communication system 100 according to one or more aspects is illustrated. A wireless communication system 100 can include one or more base stations in contact with one or more UEs. Although a single UE is shown, each base station 102 provides coverage for a plurality of UEs. UE 104 is in communication with the BS 102 that transmits information to UE 104 over forward link 106 and receives information from UE 104 over reverse link 108. Forward link (or downlink) refers to the communication link from the base stations to mobile devices, and the reverse link (or uplink) refers to the communication link from mobile devices to the base stations. Various data and control signals are communicated by the BS 102 to UE 104 via common and dedicated communication channels. In particular, UE specific control signals such as information regarding uplink resources, is communicated by the BS 102 via downlink PDCCH. Due to various reasons such as problematic payload sizes, and multiple locations of PDCCH as further detailed infra, the UE 104 may not be able to accurately decode PDCCH. As a result it is unable to identify resources allocated to it for uplink communications.

In accordance with various aspects further detailed infra, BS 102 or UE 104 can implement various methodologies to address issues associated with PDCCH thereby leading to smoother communications. For example, BS 104 can be associated with an analysis component 110 and a processing component 112 in accordance with an aspect. Although the analysis component 110 and processing component 112 are illustrated as different components for clarity, it can be appreciated that the functions described herein can be executed by a single component. The analysis component 110 identifies if payload sizes for downlink PDCCH are problematic or cause ambiguity in decoding downlink PDCCH by a receiving UE. In an aspect, the payload size can include both information fields and CRC bits. The processing component 112 facilitates avoiding transmission payloads that are identified by the analysis component 110 as being associated with problematic sizes. In accordance with a further aspect, the processing component 112 can avoid the problematic transmission payload by zero padding. In a more detailed aspect, the processing component 112 can comprise an AI (artificial Intelligence) component (not shown) that determines the number of bits for zero padding based on factors such as the payload size etc. The payloads thus processed are transmitted to UE 104 thereby aiding accurate identification of PDCCH location in the downlink transmissions. In accordance with a different aspect, the processing component 112 can accurately determine an ACK/NACK from a plurality of ACK/NACKs received from a UE on different aggregation levels. It can be appreciated that various methodologies can be implemented as detailed infra thereby reducing the chance of having two different aggregation levels decoded for one PDCCH.

As discussed supra, various physical channels are utilized within a communication system for exchange of data and control signals between the BS and UE. Physical downlink control channel (PDCCH) carries L1/L2 control information. Multiple PDCCHs can be transmitted in a sub-frame. Additionally, the PDCCH supports multiple formats with different payload sizes. Downlink control information (DCI) transmitted within PDCCH carries uplink grants, downlink scheduling, uplink power control commands, RACH (Random Access Channel) responses, etc. DCI for multiple UEs are multiplexed into the first one, two or three symbols of each subframe. Each PDCCH is mapped onto a control channel (CCH) that may be an aggregation of 1, 2, 4 or 8 control channel elements (CCEs). Thus, a physical control channel is transmitted on an aggregation of one or several control channel elements. Each UE blindly searches its expected DCI from the common search space and the UE specific search space. The starting CCE index of the UE specific search space is given by a hashing function that can comprise input parameters of UE ID, subframe number, total number of CCEs and aggregation level.

In accordance with current E-UTRA specification, there exists common search space and UE-specific search space defined in terms of aggregated CCEs with a certain aggregation level over which the UE performs blind decoding of PDCCH. CCEs in a set are contiguous and sets are spaced apart by a fixed number of CCEs. A CCE corresponds to a set of resource elements such that one PDCCH can be made up of 1, 2, 4, 8 CCEs. As channel conditions with respect to a given BS can vary for different UEs, the BS transmits to these UEs with different power levels corresponding to respective channel conditions. This is achieved via the aggregation levels of CCEs such that level 1 is the most aggressive level that requires excellent channel conditions in order to transmit to the UE while level 8 is the most conservative such that UEs with bad channel conditions can also receive the BS signals transmitted on this level. However, at any given time a UE is required to decode multiple locations and within specific location a UE has to decode different aggregation levels to identify PDCCH. Thus, for example, a UE can try six possible locations for control transmissions with aggregation levels 1 and 2, while the UE can try 2 possible locations for levels 4 and 8 in order to decode PDCCH. Additionally, for each level PDCCH can have two potential control formats to address different purposes. As a result, the UE has to try 32 different locations for identifying PDCCH transmissions. Further, the search space can overlap or remain disjoint for different aggregation levels.

Figure 2:
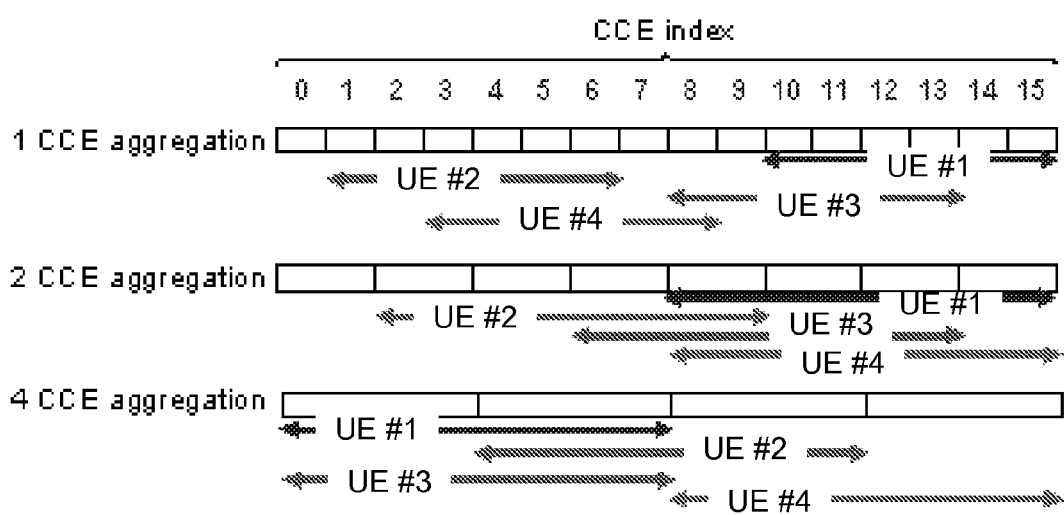
FIG. 2 is a schematic figure illustrating search space associated with different aggregation levels for various users.

FIG. 2 is a schematic figure illustrating search space associated with different aggregation levels for various users. UE specific search space associated with three aggregation levels 1, 2 and 4 for four different users U E#1, UE #2, UE #3 and UE #4 is illustrated in this figure. The search space for UE #1 for aggregation level 1 extends from CCE index 10 to CCE index 15, for aggregation level 2 the search space extends for CCE index 4 to CCE index 7 while for aggregation level 4 the search space extends from CCE index 0 to CCE index 1. Therefore, there is no overlapping of the search space corresponding to different aggregation levels for UE #1. The search space for aggregation level 1 of UE #2 spans from CCE index 1 to CCE index 6, the search space for aggregation level 2 spans from CCE index 1 to CCE index 4 while for aggregation level 4 the search space spans CCE index 1 and CCE index 2. Thus, the search space for aggregation level 4 can contain some part of search space of aggregation level 2 for UE #2. As a result, if the control channel PDCCH is transmitted on level 4 UE #2 may be able to decode multiple PDCCH for downlink assignment. As a result, it can be conjectured that either the UE is decoding another user's assignment or the UE is decoding one PDCCH more than once as illustrated for UE #2 in FIG. 2. The later situation can arise when the UE decodes one PDCCH with different aggregation sizes due to overlapping of their search spaces. The search space of different aggregation levels can overlap due to certain specific payload sizes as detailed infra. Such overlapping of search space for different aggregation levels leads to certain ambiguity regarding resources for uplink transmissions. This is because the first CCE of the downlink PDCCH is used to determine the uplink ACK/NACK resources. Therefore, the first CCE must be unique for uplink ACK/NACK resource mapping.

Figure 3:
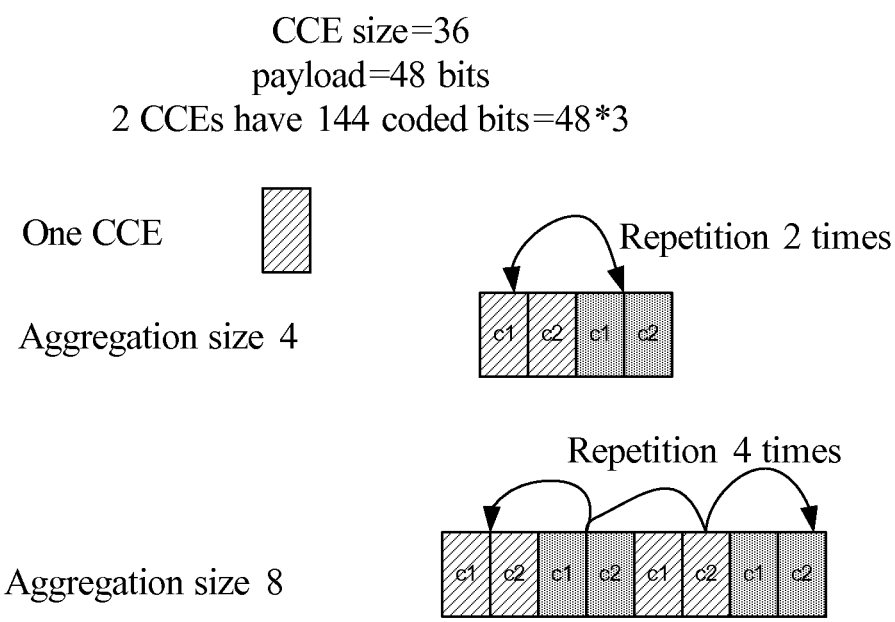
FIG. 3 illustrates an example of repetition for a particular payload size (48 bits).

Another reason for the UE to detect PDCCH at multiple locations is ambiguous payload sizes. As discussed supra, PDCCH comprises an aggregation of CCEs wherein each CCE is comprised of 36 tones which are also referred to as resource elements. Due to circular-buffer based rate matching, for a given aggregation size (2, 4 or 8), coded bits start to repeat themselves after the first CCE. For example, aggregation level 4 would involve 144 resource elements (36*4) with 72 coded symbols. FIG. 3 illustrates an example of repetition for a particular payload size (48 bits). As shown in the figure, aggregation size 4 involves two repetitions, while aggregation size 8 includes four repetitions such that each repetition starts at the same location in the circular buffer. Due to repetition of coded bits and overlapping of search space between different aggregation sizes; multiple aggregation sizes can pass the CRC (Cyclic Redundancy Check) checking. As the first CCE of PDCCH is linked to the uplink ACK/NACK resource for dynamic scheduling, UE may send its ACK/NACK in a different resource which is not identified by the base station (multiple ACK/NACK resources are possible). Generally, ten problematic payload sizes {28, 30, 32, 36, 40, 42, 48, 54, 60, 72} have been identified for LTE release-8 as the maximum PDCCH size is less than 80. It can be appreciated that the problematic payload sizes are identified herein as a means of illustration and not limitation. It can further be appreciated that as systems evolve they would be able to transmit larger payloads and therefore, the number of payload sizes that give rise to ambiguous identification of PDCCH can increase. For example, according to LTE advanced (Release 9 and beyond), the maximum payload size can be larger than 80. Accordingly, an additional ambiguous payload size of 96 bits can be identified for PDCCH when m=4, k=1 wherein m represents the number of CCEs and k represents the number of repetitions of the coded block.

Figure 4:
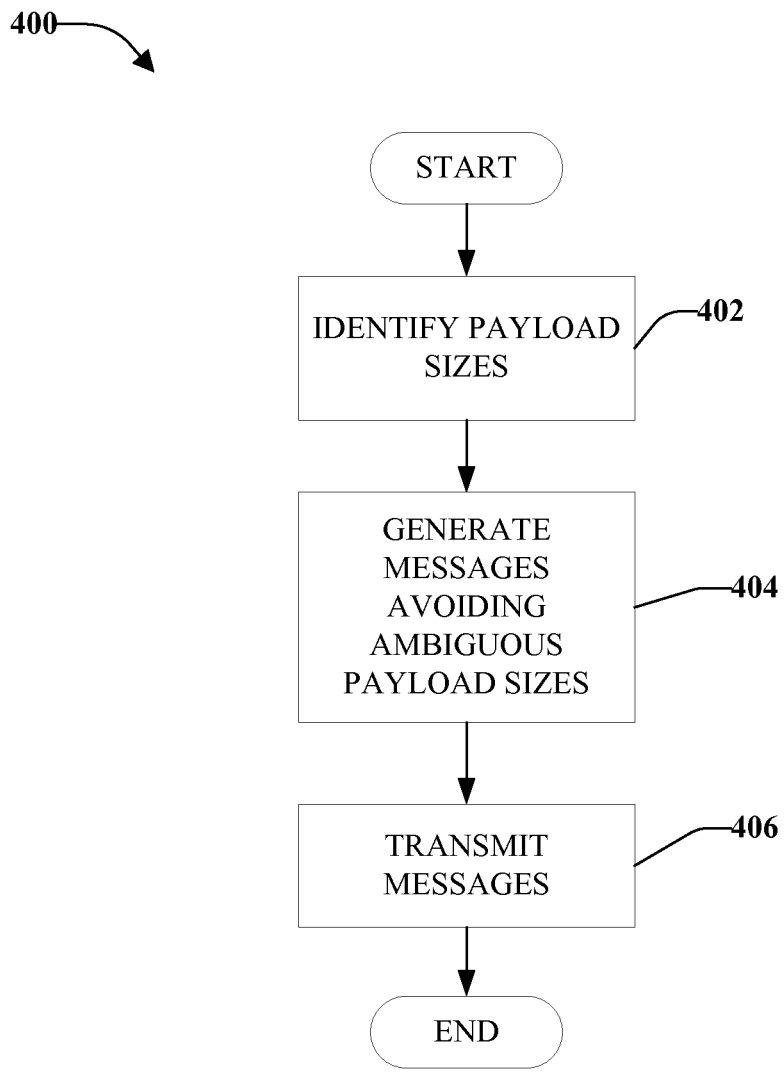
FIG. 4 illustrates a methodology of transmission in accordance with an aspect.

FIG. 4 illustrates a methodology of transmission 400 in accordance with an aspect. The method begins at 402 wherein payload sizes are determined. At 404, messages are generated in a manner that problematic payload sizes are avoided. These messages are transmitted as shown at 406. Through this methodology, transmission of payloads that cause a plurality of aggregation levels to be decoded for one PDCCH is mitigated. However, this methodology is dependent on various factors such as bandwidth definition, carrier frequency, number of transmit antennas and on whether the system implements TDD (Time Division Duplex) or FDD (Frequency Division Duplex). Additionally, this method increases the complexity of processing at the base station as all possible combinations of aggregation levels should be tested to avoid specific payload sizes.

As mentioned supra, ten problematic or ambiguous payload sizes are identified. Based on factors such as 1/3 convolutional coding rate, QPSK modulation and the fact that each CCE corresponds to 36 resource elements, the problematic payload sizes n should satisfy the following condition:

$n*3/2*k=m*36$, or, $n=m/k*24$, where k,m are integers, and m<8 n represents the payload size
m represents the number of CCEs
k represents the number of repetitions of the coded block
n should be less than $(8-m)*36*2*x=72*(8-m)*x$ where x is the maximum coding rate constraint and $0 \leq x \leq 1$
If m=7, n<54
If m=6, n<108, etc.
For instance
n=48 (m=2, k=1)
n=36 (m=3, k=2)
n=32 (m=4, k=3), etc.

In accordance with a further aspect coding rate can be less than 3/4 in order to facilitate the UE to decode the PDCCH.

Figure 5:
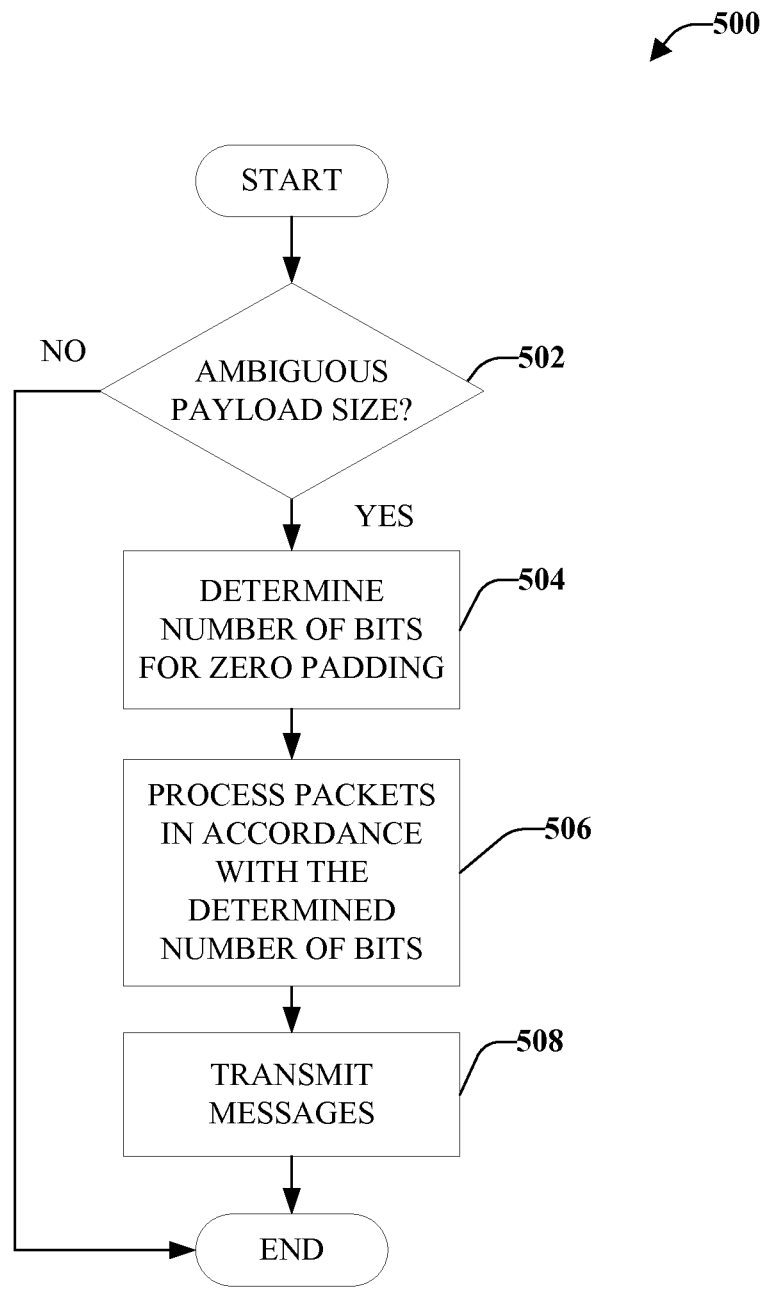
FIG. 5 details a methodology of transmission in accordance with an aspect that facilitates accurate decoding of PDCCH by a UE.

FIG. 5 details another methodology of transmission 500 in accordance with an aspect that facilitates accurate decoding of PDCCH by a UE. The methodology begins at 502 wherein it is determined if packets for downlink PDCCH correspond to ambiguous payload sizes identified supra. If the data packets do not correspond to the aforementioned ambiguous payload sizes, the method moves to 508 wherein they are transmitted to the UE. If at 502, it is determined that the packets correspond to one of the ambiguous payload sizes, based on the packet size the number of bits for zero padding can be determined as shown at 504. For example, if a payload of size 40 is padded with two bits, it results in a payload of size 42 which is another problematic size. Hence, the number of bits for zero padding can vary based at least on the payload size. At 506, the payload is processed to include the zero padding bits as determined at 504. At 508, the packets processed thus to include the zero padding bits are transmitted to a designated LTE. This methodology thereby avoids ambiguous payload sizes and aids the UE in accurately decoding PDCCH as it mitigates overlapping of aggregation levels.

Figure 6:
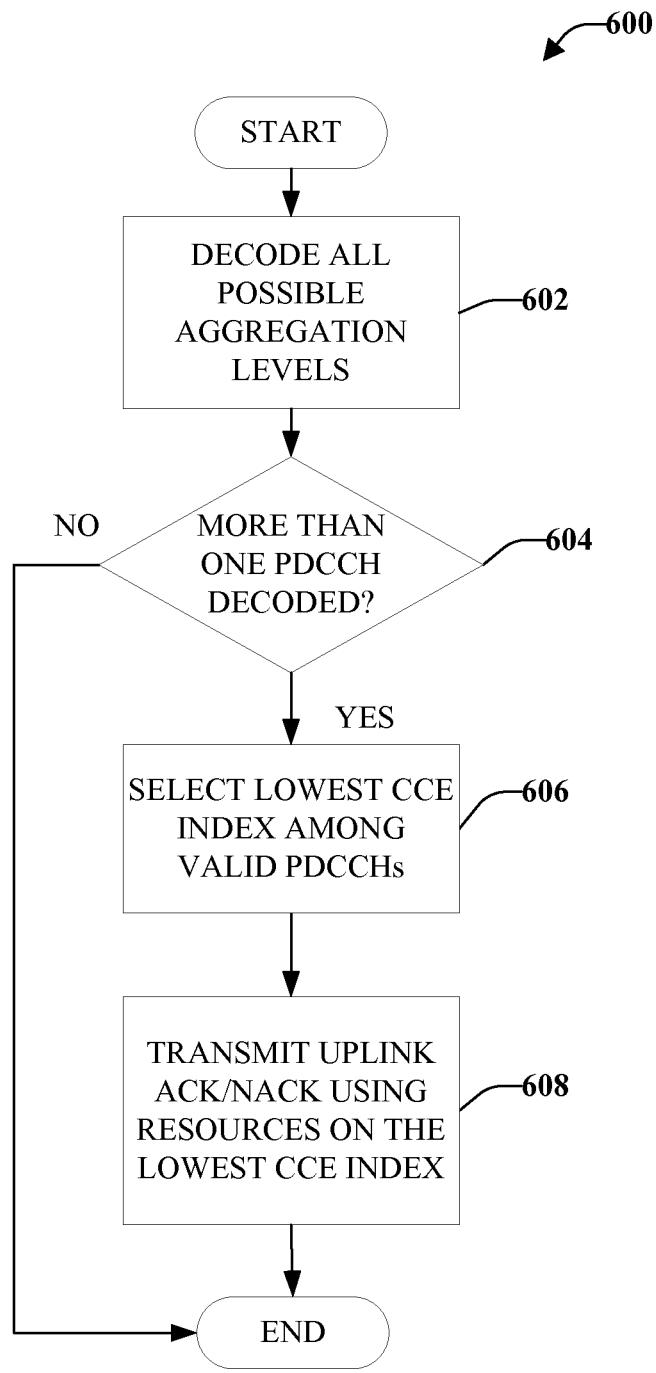
FIG. 6 illustrates a method of reception that addresses consequences arising due to multiple CRC passes in accordance with an aspect.

FIG. 6 illustrates a method of reception 600 that addresses consequences arising due to multiple CRC passes in accordance with an aspect. This method does not require changes at the base station, rather, it is implemented by the UE to unambiguously select uplink ACK/NACK resources. In accordance with this method, a UE decodes all possible aggregation sizes as shown at 602. At 604, it is determined if the UE has decoded PDCCH on more than one aggregation level. If the UE decodes only one PDCCH, the method terminates at the end block as the uplink ACK/NACK resources are accurately identified. However, if at 604, it is determined that the UE has successfully decoded more than one PDCCH, the method proceeds to 606. At 606, the lowest CCE index among those valid PDCCHs (the CCE corresponding to the highest passing aggregation level) is selected. At 608, uplink ACK/NACK is transmitted utilizing the resources determined at step 606. The method subsequently terminates on the end block. This method thus facilitates in unambiguously identifying resources for uplink ACK/NACK but require the UE to do a complete search of all the PDCCHs it can decode in order to identify the CCE with the lowest index.

Figure 7:
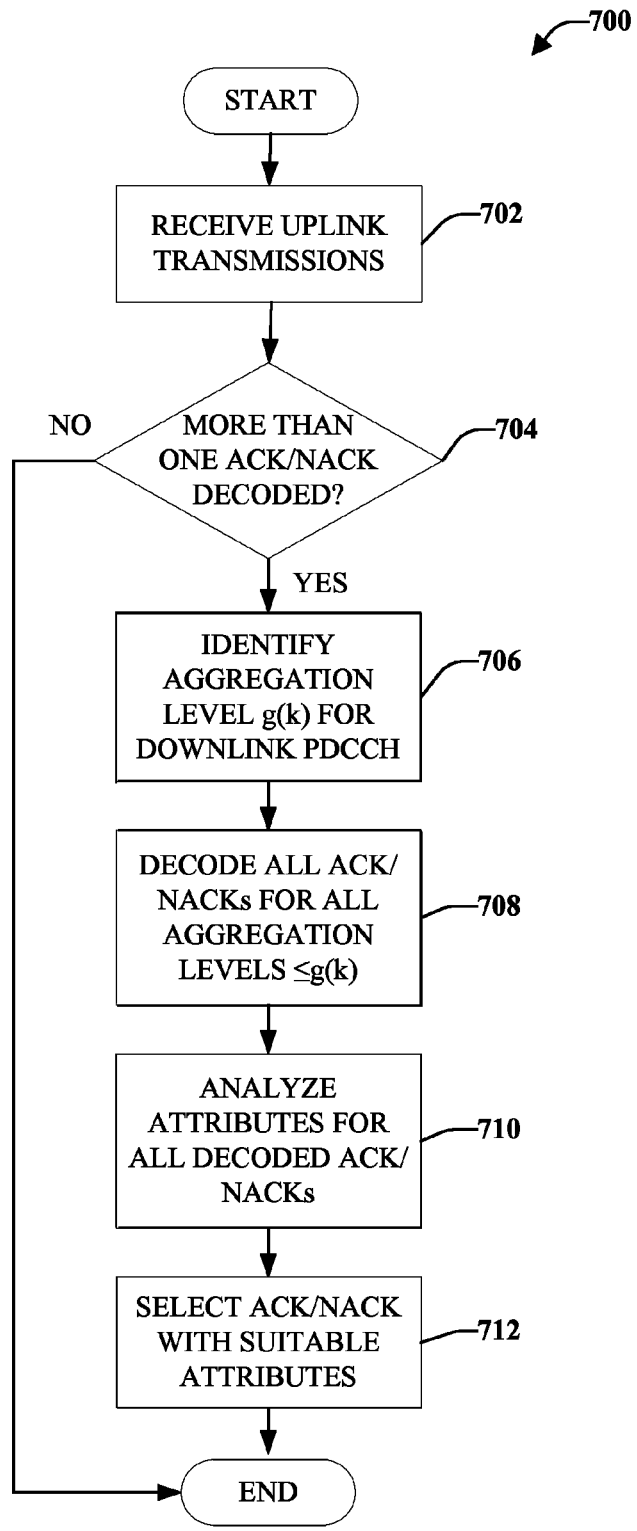
FIG. 7 is a flow chart detailing a methodology of identifying an ACK/NACK accurately from amongst a plurality of ACK/NACKs received from a UE on different aggregation levels.

FIG. 7 is a flow chart 700 detailing a methodology of identifying an ACK/NACK accurately from amongst a plurality of ACK/NACKs received from a UE on different aggregation levels. The method begins at 702 wherein a base station receives uplink transmissions from a UE. In accordance with this aspect, the uplink transmissions can comprise ACK/NACK associated with previously transmitted downlink communications. At 704 it is determined if a plurality of ACK/NACKs have been received. If it is determined at 704 that the base station has received only a single ACK/NACK corresponding to uplink resources allocated to the UE, the process terminates on the end block. However, if it is determined at 704 that the base station has received more than one ACK/NACK from the UE, the method proceeds to 706 wherein the aggregation level g(k) corresponding to the downlink PDCCH for which the UE has transmitted the ACK/NACKs is identified. At 708, all the ACK/NACKs received from a UE for all valid aggregation levels less than or equal to g(k) are decoded. At 710, the attributes associated with each of the decoded ACK/NACKs are determined and analyzed. At 712, a particular ACK/NACK is identified as the valid ACK/NACK for the downlink PDCCH based at least on the analyzed attributes. For example, the energy in an ACK/NACK channel or SNR (Signal-to-Noise Ratio) of the uplink ACK/NACK transmissions can be determined in accordance with different aspects. Based at least on the determined attributes of the decoded ACK/NACK channels, a specific ACK/NACK is identified as the ACK/NACK transmitted by the UE in response to a downlink transmission. For example, the ACK/NACK channel with the most favorable SNR or highest power can be identified as the UE response to a received downlink transmission. Rather than mitigate the UE from decoding more than one PDCCH, this method counterbalances the impact of a UE decoding more than one PDCCH by identifying a valid ACK/NACK from the plurality of ACK/NACKs sent by the UE in response to the received downlink PDCCH. While this method may increase the decoding complexity at the base station, it is very robust and would not require any further implementation at the UE.

Figure 8:
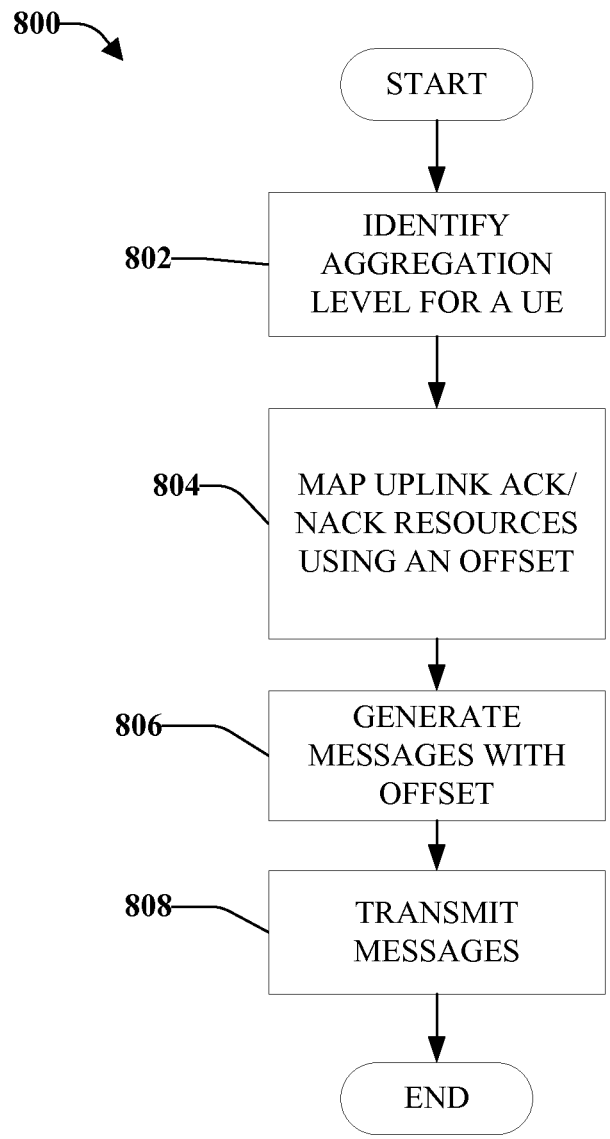
FIG. 8 is a flow chart detailing a methodology wherein accurate decoding of PDCCH is facilitated by utilizing aggregation level dependent rate matching.

FIG. 8 relates to another aspect wherein accurate decoding of PDCCH is facilitated by utilizing aggregation level dependent rate matching. For different aggregation levels, different rate matching algorithms are implemented by shifting resource mapping by an aggregation level dependent offset. The procedures involving bit collection, selection and transmission are detailed below in accordance with this aspect.

The circular buffer of length $K_w=3K_\Pi$ is generated as follows:

$w_k = v_k^{(0)}$ for $k=0, \ldots, K_\Pi-1$ $w_{K_\Pi+k} = v_k^{(1)}$ for $k=0, \ldots, K_\Pi-1$ $w_{2K_\Pi+k} = v_k^{(2)}$ for $k=0, \ldots, K_\Pi-1$ Denoting by E the rate matching output sequence length for this coded block, the rate matching output bit sequence is $e_k$, $k=0, 1, \ldots, E-1$. A (u) is defined wherein u is the possible aggregation level for control channel, i.e., u=1, 2, 4, 8

```
Set k = 0 and j = 0
while { k < E }
        if "j mod K_w ≠< NULL >
                e_k = w_(j+A(u))modK_w
                k=k+1
        j=j+1
                else
        j=j+1
                end if
end while
```

The method 800 illustrated in FIG. 8 begins at 802 wherein the aggregation level to be used for a downlink PDCCH transmission to a specific UE is determined. The resources for uplink ACK/NACK for the UE are mapped utilizing an offset as shown at 804. In accordance with a further aspect, the offset is determined based on the aggregation to be used for the downlink PDCCH. At 806, resource assignment messages to be transmitted in the downlink PDCCH are generated such that they comprise the aggregation level dependent offset. At 808, the PDCCH is transmitted to the UE thereby aiding it in accurately decoding PDCCH. Upon receiving the PDCCH, the UE extracts information considering the aggregation level dependent shift.

Figure 9:
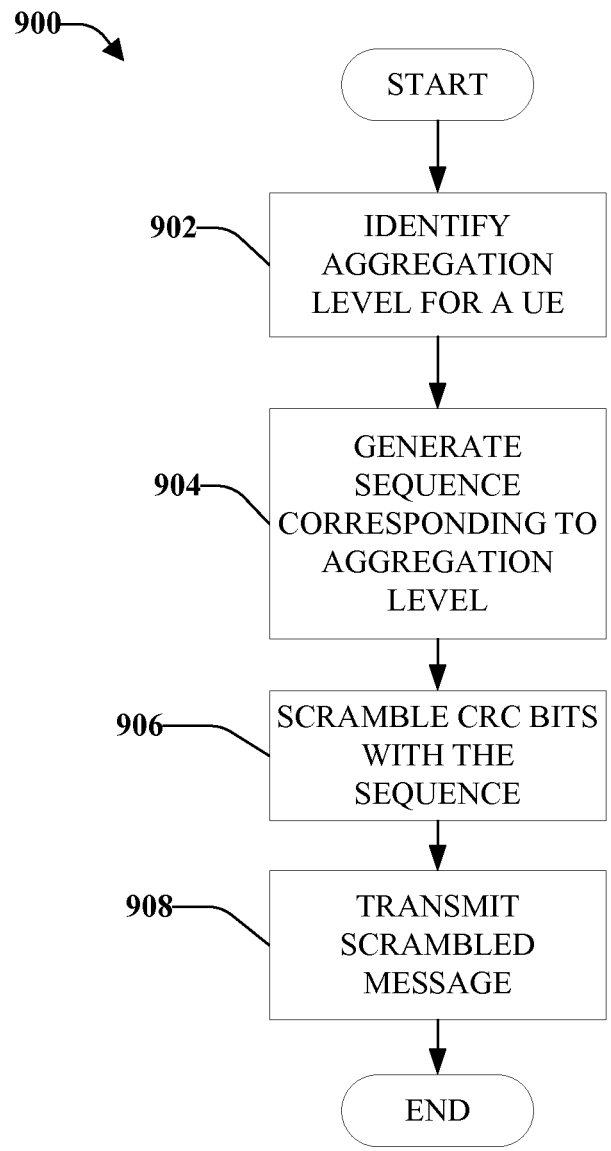
FIG. 9 details another method of transmission wherein aggregation level dependent CRC (Cyclic Redundancy Check) mask is used to aid in decoding PDCCH accurately.

FIG. 9 relates to yet another aspect wherein aggregation level dependent CRC (Cyclic Redundancy Check) mask is used to aid in decoding PDCCH accurately. This method can aid in the downlink PDCCH being accurately decoded without increasing the CRC false alarm rate. This is achieved by scrambling the CRC bits by a sequence which is determined by the aggregation level (for example, 1, 2, 4 or 8). The CRC bits are calculated by the entire transport block for one PDCCH. At the receiver, for each aggregation level the UE descrambles the bits first by the aggregation level dependent scrambling code. Subsequently it checks the CRC for one aggregation level corresponding to the scrambling sequence thereby ensuring that only one aggregation level passes the CRC. The method of transmission 900 begins at 902 wherein an aggregation level associated with a downlink PDCCH is initially determined. At 904 a sequence corresponding to the aggregation level for the PDCCH is generated. At 906, the CRC bits for the downlink PDCCH are scrambled utilizing the generated sequence and the scrambled bits are transmitted in the downlink communication as shown at 908 before terminating at the end block.

Figure 10:
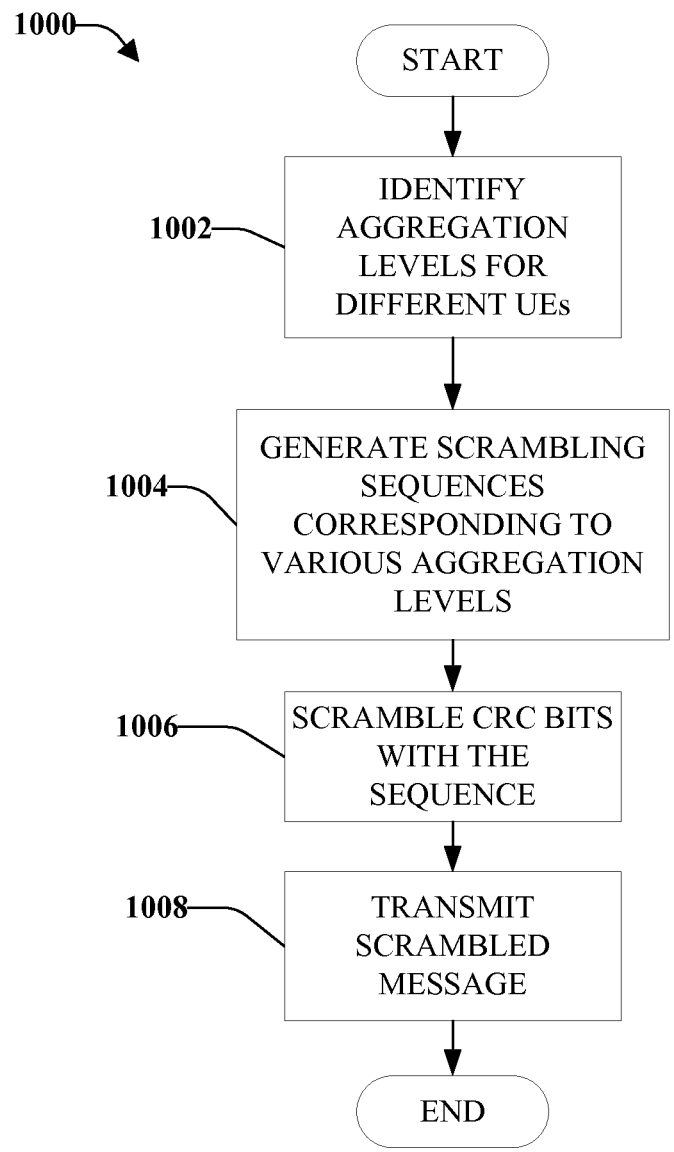
FIG. 10 shows a methodology of transmitting downlink PDCCH in a manner that aids the UE receiving it to accurately decode the PDCCH without increasing the CRC false alarm rate.

FIG. 10 relates to another aspect associated with transmitting downlink PDCCH in a manner that aids the UE receiving it to accurately decode the PDCCH without increasing the CRC false alarm rate. According to this method, aggregation level dependent scrambling codes are applied to the PDCCH. One aspect relates to scrambling the entire transport block and the corresponding CRC bits which are calculated based on the entire transport block. The receiver descrambles the decoded bits before checking the CRC. Another aspect relates to scrambling the bits after channel coding or rate matching such that the receiver initially descrambles the received signal before decoding. As a means of illustration and not limitation, one design for 4CRC mask can be:

<0, 0, 0, 0, 0, 0, 0, 0, 0, 0, 0, 0, 0, 0, 0, 0>
<1, 1, 1, 1, 1, 1, 1, 1, 1, 1, 1, 1, 1, 1, 1, 1>
<0, 1, 0, 1, 0, 1, 0, 1, 0, 1, 0, 1, 0, 1, 0, 1>
<1, 0, 1, 0, 1, 0, 1, 0, 1, 0, 1, 0, 1, 0, 1, 0>

The method 1000 begins with identifying the aggregation level to be used for a downlink PDCCH for a specific UE as shown at 1002. In accordance with this aspect, if different aggregation levels are used to transmit PDCCH for different UEs, then different scrambling sequences corresponding to the various aggregation levels are generated. The information to be transmitted on the downlink PDCCH for each UE is then scrambled using the scrambling sequence corresponding to the aggregation level used for the PDCCH for each respective UE. Accordingly, a scrambling sequence corresponding to the aggregation level is generated as shown at 1004. The CRC bits are then scrambled with the generated sequence as shown at 1006. As mentioned supra, this can be achieved in two ways by either scrambling the entire transport block and the corresponding CRC bits calculated based on the transport block or the bits can be scrambled after channel coding or rate matching. At 1008, the CRC bits scrambled in accordance with the generated sequence are transmitted in the downlink PDCCH and the method terminates at the end block.

Figure 11:
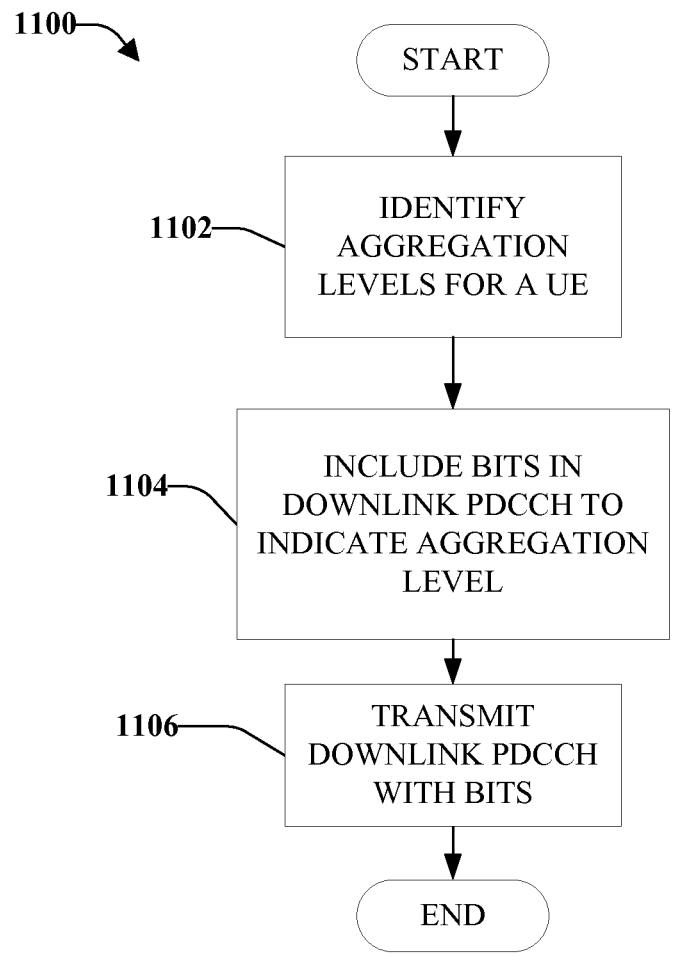
FIG. 11 illustrates a method of transmission that facilitates a UE to accurately decode PDCCH.

FIG. 11 illustrates another method of transmission 1100 that facilitates a UE to accurately decode PDCCH. The method begins at 1102 wherein the aggregation level for a downlink PDCCH for a specific UE is determined. At 1104, bits are included in PDCCH to indicate the aggregation level. In a more detailed aspect, two bits can be included to indicate any one of the four aggregation levels (1, 2, 4 or 8). PDCCH thus modified with the bits indicative of the corresponding aggregation level is sent on the downlink to the particular UE as shown at 1106. The receiver can initially decode the indicator bits to identify the aggregation level on which it can receive PDCCH.

Figure 12:
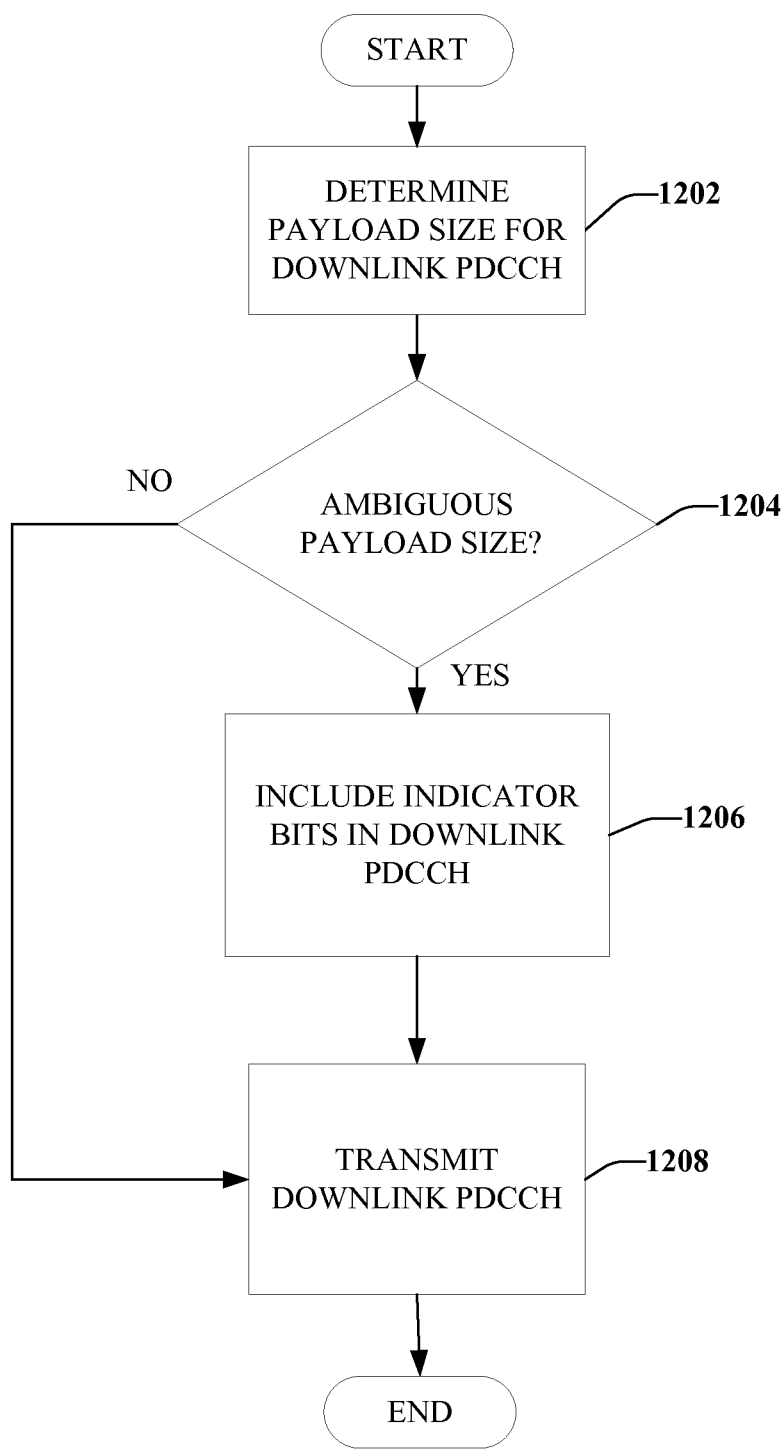
FIG. 12 illustrates another method of transmission that facilitates the UE to accurately decode PDCCH.

FIG. 12 illustrates another method of transmission 1200 that facilitates the UE to accurately decode PDCCH. The method begins at 1202 wherein a payload size for downlink PDCCH for a specific UE is determined. At 1204, it is further determined if the payload size is one of the ambiguous payload sizes mentioned supra that cause confusion at the UE regarding the aggregation level at which to decode downlink PDCCH. If the payload size does not cause ambiguity at the receiver, the method proceeds to 1208 wherein the packets are transmitted to the receiver. If at 1204 it is determined that the payload size causes ambiguity at the receiver, then bits are included in PDCCH to indicate the aggregation level as shown at 1206. In a more detailed aspect, two bits can be included to indicate any one of the four aggregation levels (1, 2, 4 or 8). PDCCH thus modified with the bits indicative of the corresponding aggregation level is sent on the downlink to the particular UE as shown at 1208. The receiver can initially decode the indicator bits to identify the aggregation level on which it can receive PDCCH. The aforementioned aspects that relate to including aggregation level indicators in downlink PDCCH can be applied for UL grants and DL power control (Format 3/3A) to satisfy the requirement that Format 0/1A/3/3A should have the same size.

In different aspects, a combination of methodologies described herein can be used to aid the UE to accurately decode the PDCCH. This facilitates the UE to correctly identify resources for uplink ACK/NACK communications thereby increasing efficiency and reducing interference within wireless communication systems.

Figure 13:
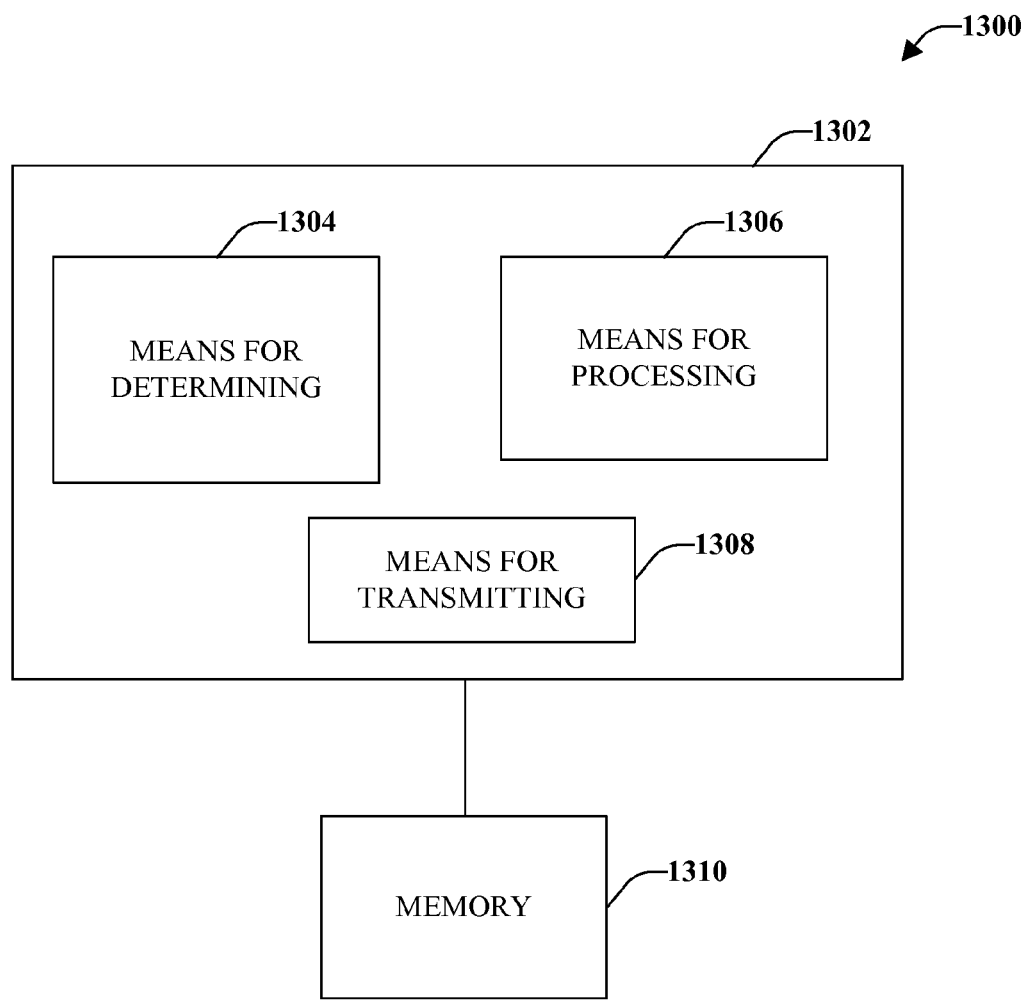
FIG. 13 is a schematic diagram of an example system configured to transmit downlink PDCCH in a wireless communications network according to one or more aspects.

With reference to FIG. 13, illustrated is an example system 1300 that is configured to transmit downlink PDCCH in a wireless communications network according to one or more aspects. It is to be appreciated that system 1300 is represented as including functional blocks, which may be functional blocks that represent functions implemented by a processor, software, or combinations thereof (e.g., firmware).

System 1300 includes a logical grouping 1302 of electrical components that can act separately or in conjunction. Logical grouping 1302 can include means for determining that analyzes size of the payload to be transmitted on downlink PDCCH and determines if the size is ambiguous. For example, the size of the payload can be such that it causes a receiving UE to decode the PDCCH on two aggregation levels thereby creating ambiguity at the UE. Also included in logical grouping 1302 is means for processing data packets 1306 that changes size of payload that is determined to be ambiguous. In accordance with different aspects, one or more bits can be included for zero padding the payload, thereby changing its size such that it causes a UE to decode downlink PDCCH on one aggregation level only. The system can further include means for transmitting the zero padded data packets 1308.

In accordance with some aspects, the means for determining 1304 can also analyze communications received from a UE and determine if more than one ACK/NACK are received from the UE. In accordance with this aspect, logical grouping 1302 further includes means for decoding all ACK/NACKs received from the UE for all valid aggregation levels less than or equal to the aggregation level of the downlink PDCCH. Also included are means for analyzing attributes associated with each of the decoded ACK/NACKs and means for selecting a valid ACK/NACK from the plurality of ACK/NACKs based at least on the analyzed attributes.

In accordance with other aspects, the means for determining 1304, can also determine an aggregation level to be associated with a downlink PDCCH. Based at least on the aggregation level an offset can be further determined such that uplink ACK/NACK resources are mapped in downlink PDCCH utilizing the offset. In accordance with this aspect, a means for mapping is included in logical grouping 1302 such that resource assignment messages can be created with the aggregation level dependent offset. In this aspect the means for transmitting 1308 transmits the resource assignment messages with the offset thereby aiding a UE receiving the downlink PDCCH to decode the PDCCH on one aggregation level and accurately identify uplink ACK/NACK resources. Another aspect relates to including one or more bits in the downlink PDCCH to indicate the aggregation level as determined by the means for determining 1304. This aspect involves means for transmitting 1308 the aggregation level indicator bits to respective UEs. A further aspect can involve transmitting the aggregation level indicator bits only to UEs that receive data packets of ambiguous payload sizes on the downlink PDCCH.

In another aspect, the grouping 1302 can also include means for scrambling CRC bits utilizing an aggregation level dependent sequence. In this aspect, the means for determining 1304 identifies the aggregation level corresponding to a UE specific PDCCH. This aspect also comprises a means for generating an aggregation level dependent sequence generator such that the CRC bits are scrambled utilizing such a sequence. The means for transmitting 1310 transmits the scrambled CRC bits.

Another aspect relates to generating a scrambling sequence based on respective aggregation levels associated a plurality of UEs for receiving a downlink PDCCH. A means for encoding CRC bits to be transmitted to the plurality of UEs utilizing the aggregation level dependent scrambling sequence is included in the logical grouping 1302 according to this aspect.

Additionally, system 1300 can include a memory 1308 that retains instructions for executing functions associated with electrical components 1304 and 1306, or other components. While shown as being external to memory 1310, it is to be understood that one or more of electrical components 1304 and 1306 can exist within memory 1310.

Figure 14:
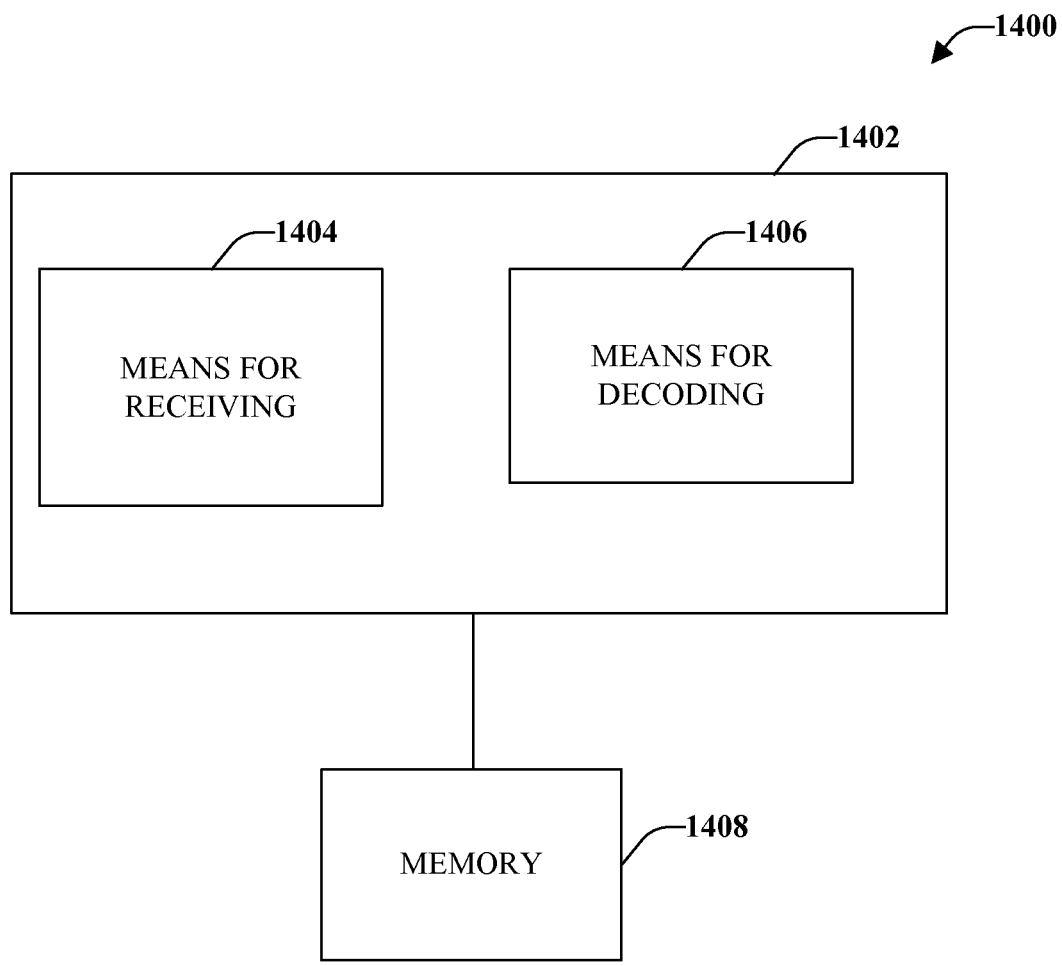
FIG. 14 illustrates another example system that is configured to receive downlink PDCCH in a wireless communications network according to one or more aspects.

FIG. 14, illustrates another example system 1400 that is configured to receive downlink PDCCH in a wireless communications network according to one or more aspects. It is to be appreciated that system 1400 is represented as including functional blocks, which may be functional blocks that represent functions implemented by a processor, software, or combinations thereof (e.g., firmware).

System 1400 includes a logical grouping 1402 of electrical components that can act separately or in conjunction. Logical grouping 1402 can include means for receiving CRC bits 1404 scrambled with an aggregation level dependent scrambling sequence. Means for decoding 1406, also included within 1402, decodes a received downlink PDCCH on an associated aggregation level. The aggregation level is obtained by descrambling the CRC (Cyclic Redundancy Check) bits received in the downlink PDCCH utilizing the aggregation level dependent sequence.

Additionally, system 1400 can include a memory 1408 that retains instructions for executing functions associated with electrical components 1404 and 1406, or other components. While shown as being external to memory 1408, it is to be understood that one or more of electrical components 1404 and 1406 can exist within memory 1308.

Figure 15:
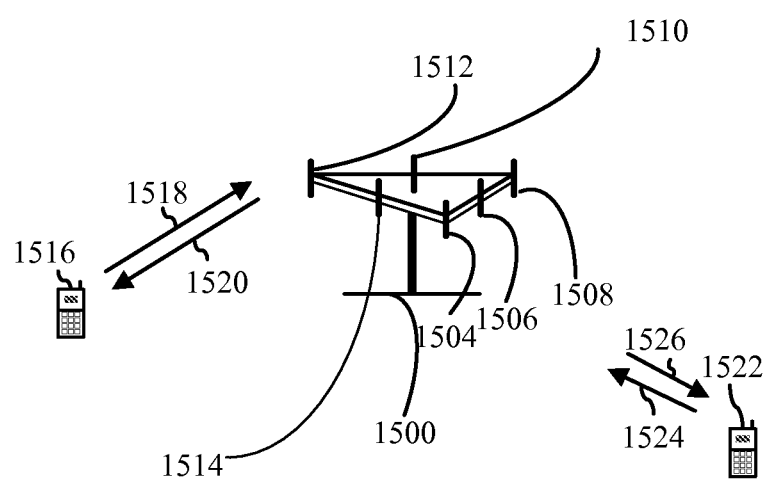
FIG. 15 illustrates a multiple access wireless communication system according to one embodiment.

Referring to FIG. 15, a multiple access wireless communication system according to one embodiment is illustrated. An access point 1500 (AP), also referred to as e-NodeB or e-NB, includes multiple antenna groups, one including 1504 and 1506, another including 1508 and 1510, and an additional including 1512 and 1514. In FIG. 15, only two antennas are shown for each antenna group, however, more or fewer antennas may be utilized for each antenna group. Access terminal 1516 (AT), also referred to as user equipment (UE), is in communication with antennas 1512 and 1514, where antennas 1512 and 1514 transmit information to access terminal 1516 over forward link 1520 and receive information from access terminal 1516 over reverse link 1518. Access terminal 1522 is in communication with antennas 1506 and 1508, where antennas 1506 and 1508 transmit information to access terminal 1522 over forward link 1526 and receive information from access terminal 1522 over reverse link 1524. In a FDD system, communication links 1528, 1520, 1524 and 1526 may use different frequency for communication. For example, forward link 1520 may use a different frequency then that used by reverse link 1518.

Each group of antennas and/or the area in which they are designed to communicate is often referred to as a sector of the access point. In the embodiment, antenna groups each are designed to communicate to access terminals in a sector, of the areas covered by access point 1500.

In communication over forward links 1520 and 1526, the transmitting antennas of access point 1500 utilize beamforming in order to improve the signal-to-noise ratio of forward links for the different access terminals 1516 and 1524. Also, an access point using beamforming to transmit to access terminals scattered randomly through its coverage causes less interference to access terminals in neighboring cells than an access point transmitting through a single antenna to all its access terminals.

An access point may be a fixed station used for communicating with the terminals and may also be referred to as an access point, a Node B, or some other terminology. An access terminal may also be called an access terminal, user equipment (UE), a wireless communication device, terminal, or some other terminology.

Figure 16:
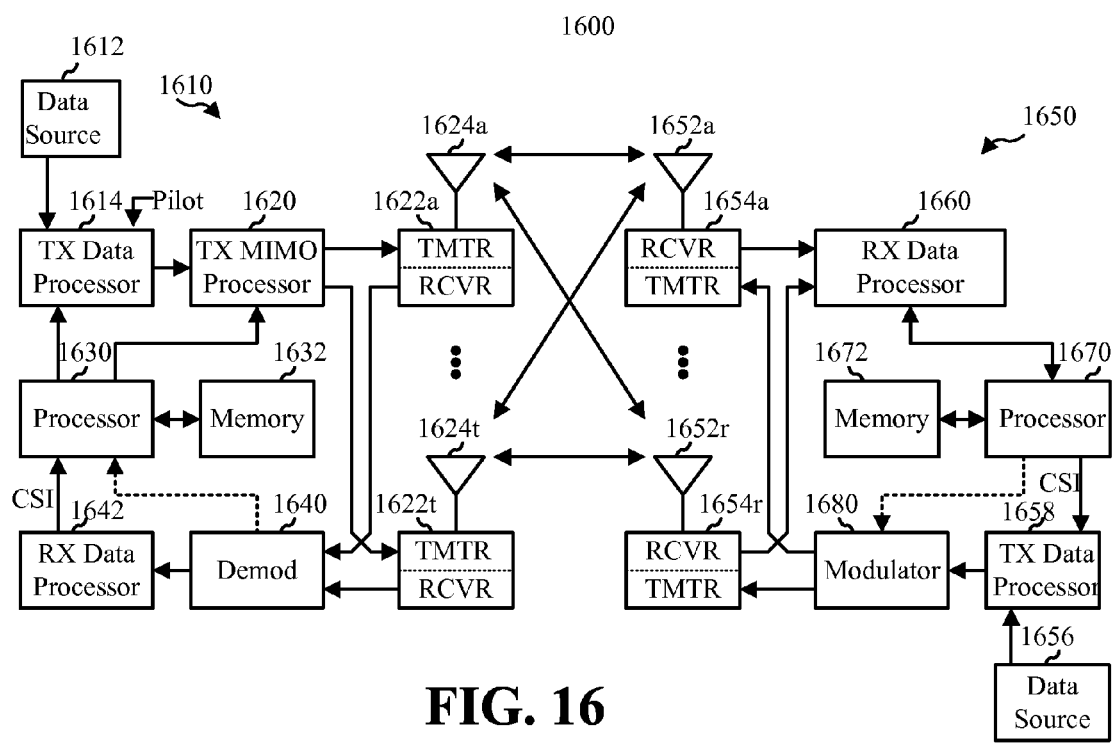
FIG. 16 is a block diagram of an embodiment of a transmitter system (also known as the access point) and a receiver system (also known as access terminal) in a MIMO system.

FIG. 16 is a block diagram of an embodiment of a transmitter system 1610 (also known as the access point) and a receiver system 1650 (also known as access terminal) in a MIMO system 1600. At the transmitter system 1610, traffic data for a number of data streams is provided from a data source 1612 to a transmit (TX) data processor 1614.

In an embodiment, each data stream is transmitted over a respective transmit antenna. TX data processor 1614 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 1630 in conjunction with memory 1632.

The modulation symbols for all data streams are then provided to a TX MIMO processor 1620, which may further process the modulation symbols (e.g., for OFDM). TX MIMO processor 1620 then provides $N_T$ modulation symbol streams to $N_T$ transmitters (TMTR) 1622a through 1622t. In certain embodiments, TX MIMO processor 1620 applies beamforming weights to the symbols of the data streams and to the antenna from which the symbol is being transmitted.

Each transmitter 1622 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 1622a through 1622t are then transmitted from $N_T$ antennas 1624a through 1624t, respectively.

At receiver system 1650, the transmitted modulated signals are received by $N_R$ antennas 1652a through 1652r and the received signal from each antenna 1652 is provided to a respective receiver (RCVR) 1654a through 1654r. Each receiver 1654 conditions (e.g., filters, amplifies, and downconverts) a respective received signal, digitizes the conditioned signal to provide samples, and further processes the samples to provide a corresponding "received" symbol stream.

An RX data processor 1660 then receives and processes the $N_R$ received symbol streams from $N_R$ receivers 1654 based on a particular receiver processing technique to provide $N_T$ "detected" symbol streams. The RX data processor 1660 then demodulates, deinterleaves, and decodes each detected symbol stream to recover the traffic data for the data stream. The processing by RX data processor 1660 is complementary to that performed by TX MIMO processor 1620 and TX data processor 1614 at transmitter system 1610.

A processor 1670 periodically determines which pre-coding matrix to use (discussed below). Processor 1670 formulates a reverse link message comprising a matrix index portion and a rank value portion.

The reverse link message may comprise various types of information regarding the communication link and/or the received data stream stored in memory 1672. The reverse link message is then processed by a TX data processor 1658, which also receives traffic data for a number of data streams from a data source 1656, modulated by a modulator 1680, conditioned by transmitters 1654a through 1654r, and transmitted back to transmitter system 1610.

At transmitter system 1610, the modulated signals from receiver system 1650 are received by antennas 1624, conditioned by receivers 1622, demodulated by a demodulator 1640, and processed by a RX data processor 1642 to extract the reserve link message transmitted by the receiver system 1650. Processor 1630 then determines which pre-coding matrix to use for determining the beamforming weights then processes the extracted message.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method of transmission that facilitates accurate decoding of PDCCH (Physical Downlink Control Channel) by a UE (User Equipment) comprising:
    determining if payload size of a payload for the PDCCH is ambiguous, wherein an ambiguous payload size is a payload size that may cause a UE to decode the downlink PDCCH on more than one aggregation level;
    changing the size of the payload by zero-padding data packets for the downlink PDCCH with one or more bits for the ambiguous payload size; and
    transmitting the payload with the zero padded data packets.

2. The method of claim 1, wherein the number of bits for zero padding is based at least on the payload size.

3. The method of claim 1, wherein the payload size n is ambiguous if $n=m/k*24$, where k, m are integers, m represents the number of CCEs (Control Channel Elements) and k represents number of repetitions of a coded block.

4. The method of claim 3 wherein m is less than 8 and x is maximum coding rate, $0<x\leq 1$ such that n is less than $(8-m)*36*2*x$.

5. At least one processor configured to facilitate accurate decoding of PDCCH (Physical Downlink Control Channel) by a UE (User Equipment) comprising:
    a first processing module for determining if payload size of a payload for the PDCCH is ambiguous, wherein an ambiguous payload size is a payload size that may cause a UE to decode the downlink PDCCH on more than one aggregation level; and
    a second processing module for changing the size of the payload by zero-padding data packets for the downlink PDCCH with one or more bits for the ambiguous payload size.

6. The processor of claim 5, wherein the second processing module determines the number of bits for zero padding based at least on the payload size.

7. The processor of claim 5, wherein the first processing module identifies the payload size n as ambiguous if $n=m/k*24$, where k, m are integers, m represents the number of CCEs (Control Channel Elements) and k represents number of repetitions of a coded block.

8. The processor of claim 7, the first processing module further identifies n as ambiguous if m is less than 8 and n is less than $72*(8-m)*x$ wherein x is maximum coding rate and $0<x\leq 1$.

9. A computer program product, comprising:
    a non-transitory computer-readable medium comprising:
        a first set of codes for causing a computer to determine if payload size of data packets for downlink PDCCH (Physical Downlink Control Channel) is ambiguous, wherein an ambiguous payload size is a payload size that may cause a UE to decode the downlink PDCCH on more than one aggregation level; and
        a second set of codes for causing the computer to include one or more bits in the data packets that correspond to the ambiguous payload size for zero padding.

10. The computer program product of claim 9, further comprising a third set of codes that determine a number of bits to be included into the data packets for zero padding based at least on the payload size.

11. The computer program product of claim 9, wherein the first set of codes determines that the payload size (n) is ambiguous if $n=m/k*24$, where k, m are integers, m represents the number of CCEs (Control Channel Elements) and k represents number of repetitions of a coded block.

12. The computer program product of claim 11, wherein the first set of codes determines that the payload size (n) is ambiguous if m is less than 8 and n is less than $72*(8-m)*x$ wherein x is maximum coding rate and $0<x\leq 1$.

13. An apparatus for facilitating accurate decoding of PDCCH (Physical Downlink Control Channel) by a UE (User Equipment), comprising:
    means for determining payload size of a payload for the PDCCH;
    means for processing data packets for the downlink PDCCH by including one or more bits for ambiguous payload sizes, wherein an ambiguous payload size is a payload size that may cause a UE to decode the downlink PDCCH on more than one aggregation level; and
    means for transmitting the payload with the zero padded data packets.

14. A wireless communication apparatus, comprising:
    a memory that stores instructions for analyzing if payload for transmission in downlink PDCCH (Physical Downlink Control Channel) is associated with one of problematic sizes, wherein a problematic size is a payload size that may cause a UE to decode the downlink PDCCH on more than one aggregation level, and if the payload has a problematic size, then changing size of data packets by zero padding the data packets with one or more bits; and
    a processor, coupled to the memory, configured to execute the instructions stored in the memory.

15. The wireless communication apparatus of claim 14, the memory further comprises instructions for determining a number of bits for zero padding the data packets based at least on the payload size.

* * * * *